United States Patent
Lee et al.

(10) Patent No.: US 12,445,329 B2
(45) Date of Patent: Oct. 14, 2025

(54) METHOD AND DEVICE FOR TRANSMITTING AND RECEIVING SIGNAL BY USING TIME OFFSET IN TIME-ASYNCHRONOUS NON-ORTHOGONAL MULTIPLE ACCESS SYSTEM

(71) Applicants: Samsung Electronics Co., Ltd., Suwon-si (KR); UIF (University Industry Foundation), Yonsei University, Seoul (KR)

(72) Inventors: Kwonjong Lee, Suwon-si (KR); Seunghyun Lee, Suwon-si (KR); Hakkeon Lee, Seoul (KR); Daesik Hong, Seoul (KR); Joohyun Son, Seoul (KR); Insik Jung, Seoul (KR)

(73) Assignees: Samsung Electronics Co., Ltd., Suwon-si (KR); UIF (University Industry Foundation), Yonsei University, Seoul (KR)

( * ) Notice: Subject to any disclaimer, the term of this patent is extended or adjusted under 35 U.S.C. 154(b) by 3 days.

(21) Appl. No.: 18/577,199

(22) PCT Filed: Jul. 8, 2022

(86) PCT No.: PCT/KR2022/009895
§ 371 (c)(1),
(2) Date: Jan. 5, 2024

(87) PCT Pub. No.: WO2023/282679
PCT Pub. Date: Jan. 12, 2023

(65) Prior Publication Data
US 2024/0396769 A1    Nov. 28, 2024

(30) Foreign Application Priority Data
Jul. 8, 2021 (KR) .......................... 10-2021-0089970

(51) Int. Cl.
H04B 7/0413 (2017.01)
H04B 7/0456 (2017.01)
(Continued)

(52) U.S. Cl.
CPC ..... *H04L 25/03834* (2013.01); *H04B 7/0456* (2013.01); *H04W 72/0446* (2013.01)

(58) Field of Classification Search
CPC ......... H04L 25/03834; H04L 27/26532; H04L 25/03; H04L 25/03343; H04L 5/00;
(Continued)

(56) References Cited

U.S. PATENT DOCUMENTS 11,265,824 B2 * 3/2022 Bala .................. H04L 5/0005
2017/0155484 A1 6/2017 Kang et al.
(Continued)

FOREIGN PATENT DOCUMENTS

CN    101197612 A    6/2008
CN    112654081 A    4/2021
(Continued)

OTHER PUBLICATIONS

International Search Report and Written Opinion of the International Searching Authority dated Oct. 21, 2022, in connection with International Application No. PCT/KR2022/009895, 10 pages.
(Continued)

*Primary Examiner* — Eva Y Puente

(57) ABSTRACT

The present disclosure relates to a 5G or 6G communication system for supporting a higher data transmission rate than a 4G system such as LTE. A method in which a base station transmits a signal by using a time offset in a time-asynchronous non-orthogonal multiple access (TA-NOMA) system, according to an embodiment of the present disclosure, comprises the steps of: checking a first bit stream for a first terminal, and a second bit stream for a second terminal;
(Continued)

determining a time offset for the second terminal on the basis of the number of terminals operating in the TA-NOMA system and a pulse shape used in the TA-NOMA system; and transmitting a first signal corresponding to the first bit stream and a second signal corresponding to the second bit stream on resources that are allocated based on the time offset.

15 Claims, 6 Drawing Sheets

(51) Int. Cl.
*H04L 25/03* (2006.01)
*H04W 72/0446* (2023.01)

(58) Field of Classification Search
CPC ... H04L 5/0026; H04L 5/0037; H04L 5/0085; H04W 72/23; H04W 72/0446; H04W 72/0453; H04W 72/21; H04W 76/27; H04W 72/1268; H04W 74/0833; H04W 72/02; H04B 7/0413; H04B 7/0456; H04B 7/0617; H04B 7/0421; H04B 7/0434; H04B 17/12; H04B 17/254; H04B 17/27; H04B 17/373; H04B 17/3912; H04B 7/0486; H04B 7/0619; H04B 7/063; H04B 7/0632
See application file for complete search history.

(56) References Cited

U.S. PATENT DOCUMENTS

| | | |
|---|---|---|
| 2017/0230942 A1 | 8/2017 | Lim et al. |
| 2019/0238367 A1 | 8/2019 | Lei et al. |
| 2020/0008221 A1 | 1/2020 | Keating et al. |
| 2020/0044762 A1* | 2/2020 | Lee ...................... H04L 5/0037 |
| 2021/0007095 A1 | 1/2021 | Eldessoki et al. |

FOREIGN PATENT DOCUMENTS

| | | |
|---|---|---|
| JP | 2018-137669 A | 8/2018 |
| KR | 10-2016-0118992 A | 10/2016 |
| KR | 10-2017-0021306 A | 2/2017 |
| KR | 10-2020-0125631 A | 11/2020 |

OTHER PUBLICATIONS

Lee et al., "Exploiting Intentional Time-Domain Offset in Downlink Multicarrier NOMA Systems", IEEE Wireless Communications Letters, vol. 10, No. 7, Jul. 2021, 4 pages.

Zou et al., "An Analysis of Two-User Uplink Asynchronous Non-orthogonal Multiple Access Systems", IEEE Transactions On Wireless Communications, vol. 18, No. 2, Feb. 2019, 15 pages.

* cited by examiner

METHOD AND DEVICE FOR TRANSMITTING AND RECEIVING SIGNAL BY USING TIME OFFSET IN TIME-ASYNCHRONOUS NON-ORTHOGONAL MULTIPLE ACCESS SYSTEM

CROSS-REFERENCE TO RELATED APPLICATIONS

This application is a 371 National Stage of International Application No. PCT/KR2022/009895 filed Jul. 8, 2022, which claims priority to Korean Patent Application No. 10-2021-0089970 filed Jul. 8, 2021, the disclosures of which are herein incorporated by reference in their entirety.

TECHNICAL FIELD

The present invention relates to a method and device using an intentional time offset in a wireless communication system supporting time-asynchronous nonorthogonal multiple access (TA-NOMA).

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mecahnisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

DETAILED DESCRIPTION OF THE INVENTION

Technical Problem

The disclosure provides a method and device for applying a time offset in a wireless communication system supporting time-asynchronous nonorthogonal multiple access (TA-NOMA).

Use of the TA-NOMA system in a wireless communication system requires discussion about the transmission/reception end. In the TA-NOMA system, when supporting services for multiple UEs, individual-time offset settings for each UE are required.

To apply an intentional time offset, a method is needed to determine the optimal time offset for each UE. Further, since the channel experienced in each symbol is a continuously changing value, a method for determining the optimal time offset according to the channel state is needed.

Technical Solution

A method for transmitting a signal using a time offset by a base station in a time-asynchronous nonorthogonal multiple access (TA-NOMA) system according to an embodiment of the disclosure may comprise identifying a first bit stream for a first user equipment (UE) and a second bit stream for a second UE, determining a time offset for the second UE based on a number of UEs operating in the TA-NOMA system and a pulse shape used in the TA-NOMA system, and transmitting a first signal corresponding to the first bit stream and a second signal corresponding to the second bit stream on a resource allocated based on the time offset.

According to an embodiment, determining the time offset may include identifying information about a plurality of time offsets predetermined according to the number of the UEs and the pulse shape and determining the time offset for the second UE based on information about the plurality of time offsets.

According to an embodiment, the method for transmitting the signal using the time offset by the base station may further comprise configuring a pre-coding matrix in a block unit to be used in the base station based on the time offset and configuring a post-coding matrix in a block unit to be used in the first UE and the second UE based on the time offset.

According to an embodiment, the method for transmitting the signal using the time offset by the base station may further comprise allocating a resource in a symbol unit for each of the first UE and the second UE based on the pre-coding matrix and the post-coding matrix.

According to an embodiment, the method for transmitting the signal using the time offset by the base station may further comprise broadcasting at least one of the time offset for the second UE, a number of symbols per block, and index information about a precoding matrix predetermined between the base station and the UEs.

A method for receiving a signal using a time offset by a UE in a time-asynchronous nonorthogonal multiple access (TA-NOMA) system according to an embodiment of the disclosure may comprise receiving, from a base station, a first signal for another UE and a second signal for the UE, performing sampling on the first signal and the second signal to identify a time offset set for the second signal, and obtaining a bit stream corresponding to the second signal based on a result of the sampling. The time offset may be determined based on the number of UEs operating in the TA-NOMA system and a pulse shape used in the TA-NOMA system.

A base station transmitting a signal using a time offset in a TA-NOMA system according to an embodiment of the disclosure may comprise a transceiver and a controller connected with the transceiver and controlling the transceiver. The controller may identify a first bit stream for a first UE and a second bit stream for a second UE, determine a time offset for the second UE based on a pulse shape used in the TA-NOMA system and the number of UEs operating in the TA-NOMA system, and control to transmit a first signal corresponding to the first bit stream and a second signal corresponding to the second bit stream on a resource allocated based on the time offset.

A UE receiving a signal using a time offset in a TA-NOMA system according to an embodiment of the disclosure may comprise a transceiver and a controller connected with the transceiver and controlling the transceiver. The controller may control to receive, from a base station, a first signal for another UE and a second signal for the UE, perform sampling on the first signal and the second signal to identify a time offset set for the second signal, and obtain a bit stream corresponding to the second signal based on a result of the sampling. The time offset may be determined based on the number of UEs operating in the TA-NOMA system and a pulse shape used in the TA-NOMA system.

Advantageous Effects

The disclosure may enhance transmission/reception efficiency by supporting an intentional time offset in a wireless communication system supporting time-asynchronous nonorthogonal multiple access (TA-NOMA).

BRIEF DESCRIPTION OF DRAWINGS

For a more complete understanding of the disclosure and its advantages, the following description will be made with reference to the accompanying drawings, where like reference numerals indicate like parts.

MODE FOR CARRYING OUT THE INVENTION

Figure 1:
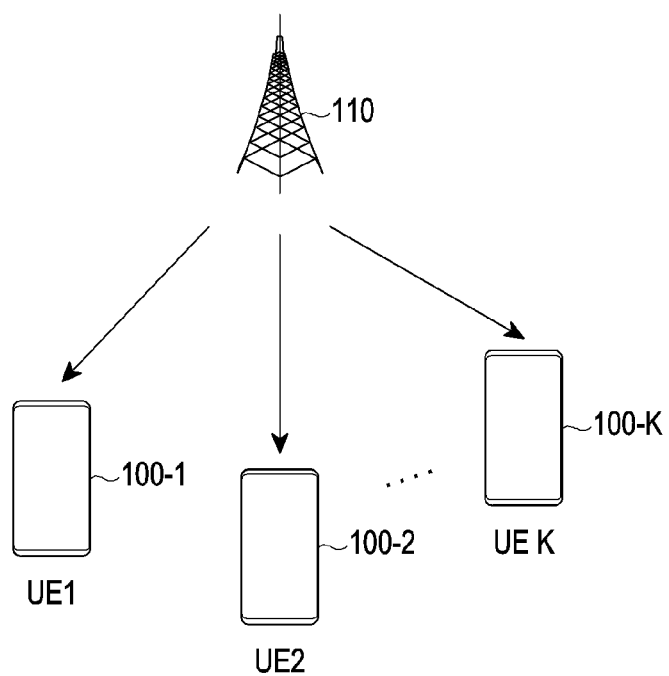
FIG. 1 illustrates a wireless communication system using an intentional time offset according to an embodiment of the disclosure.

In describing the embodiments, the description of technologies that are known in the art and are not directly related to the present invention is omitted. This is for further clarifying the gist of the present disclosure without making it unclear.

For the same reasons, some elements may be exaggerated or schematically shown. The size of each element does not necessarily reflects the real size of the element. The same reference numeral is used to refer to the same element throughout the drawings.

Advantages and features of the disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. The same reference numeral denotes the same element throughout the specification.

Hereinafter, embodiments of the present invention are described in detail with reference to the accompanying drawings.

The disclosure relates to a time-asynchronous nonorthogonal multiple access (TA-NOMA) system using an intentional time offset and relates to a method and device used for signaling and a transmission/reception end of TA-NOMA.

In 4G communication systems and 5G communication systems, synchronization between signals in frequency and time axis has been considered as an essential element in system performance. However, to achieve a higher data rate than before, studies on intentionally generating an offset in the frequency axis and the time axis are in progress. In particular, the TA-NOMA system which operates based on a single carrier may enhance system transmission capacity by setting an intentional time offset between user signals.

FIG. 1 illustrates a wireless communication system using an intentional time offset according to an embodiment of the disclosure.

FIG. 1 illustrates a downlink where user equipment (UEs) 100-1 to 100-$k$ receive data from a base station 110. The base station 100 may multiplex intentional signals for the multiple UEs 100-1 to 100-$k$.

The UEs 100-1 to 100-$k$, also called terminals or mobile terminals, may be stationary or mobile and may be implemented as cellular phones or personal computer devices. The base station 110, which is a fixed terminal, may be referred to as an access point (AP) or by another equivalent term.

The downlink signals transmitted by the base station 110 to the UEs 100-1 to 100-$k$ may include data signals for transferring information content, control signals for transferring downlink control information, and reference signals known as pilot signals. The base station 110 transmits data information or downlink control information through physical downlink shared channels or physical downlink control channels, respectively.

Figure 2:
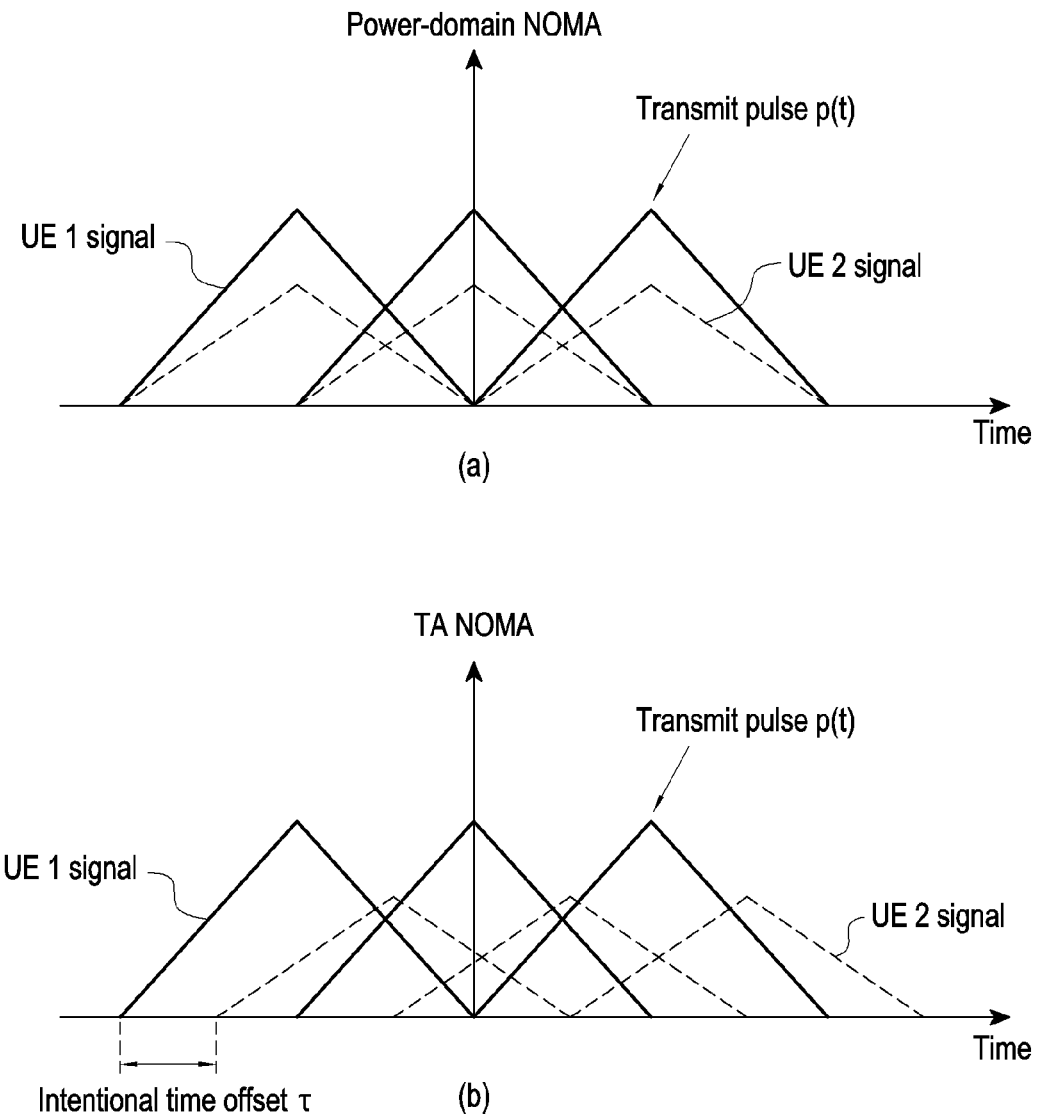
FIGS. 2A and 2B illustrate an example of transmitting three symbols in a nonorthogonal multiple access system according to an embodiment of the disclosure.

FIGS. 2A and 2B illustrate an example of transmitting three symbols in a nonorthogonal multiple access system according to an embodiment of the disclosure.

FIG. 2A illustrates an example of transmitting three symbols in single-carrier-based power-domain nonorthogonal multiple access (NOMA) which does not use an intentional time offset. FIG. 2B illustrates an example of transmitting three symbols in single-carrier-based nonorthogonal multiple access (TA-NOMA) using an intentional time offset.

Referring to FIGS. 2A and 2B, a nonorthogonal multiple access system supporting two UEs, i.e., UE1 and UE2, in a single-carrier-based nonorthogonal multiple access system transmitting three symbols is assumed.

In FIG. 2A, no time offset is set between the UE1 signal and the UE2 signal, and the transmit pulse of the UE1 signal and the corresponding transmit pulse of the UE2 signal may be transmitted on the same time resource. In the power-domain NOMA system, the transmit pulse power of the UE1 signal is larger than the transmit pulse power of the UE2 signal, and the UE1 signal and the UE2 signal may be distinguished by the difference in the power domain.

In FIG. 2B, a time offset between the UE1 signal and the UE2 signal is set, and the transmit pulse of the UE1 signal and the corresponding transmit pulse of the UE2 signal may be transmitted while overlapping each other with the set time offset generated. In the TA-NOMA system unlike the power-domain NOMA system, the transmit pulse of the UE1 signal and the corresponding transmit pulse of the UE2 signal may be transmitted while overlapping each other with a time offset corresponding to a prime number multiple of the symbol interval generated.

The base station may superpose and transmit signals to the multiple UEs. In this case, a time offset is applied between the UE signals before overlapping, and the degree of offset may differ from UE to UE.

FIGS. 2A and 2B consider a case of transmitting one signal block composed of N symbols without loss of generality. Also considered are one reference UE (user with no offset applied) and a UE which generates an offset without loss of generality. Even in the case of three or more people, if the reference user and the corresponding users are considered, a time offset may be applied in the same manner.

Precoding needs to be performed to maximally obtain the degree of freedom (DoF) using an intentional offset. To that end, TA-NOMA may perform precoding in block units.

When three symbols are transmitted in one block in FIGS. 2A and 2B, the reception signal obtained in UE r may be expressed according to Equation 1.

$$y^r = h_r R P x + n^r \qquad \text{[Equation 1]}$$

Here, $h_r$ is the channel experienced by UE r, and P and x denote the power allocated to the signal of UE r and the matrix representing the symbol of UE r. The R matrix refers to the matrix representing the influence between the symbols due to an intentional time offset. $n^r$ refers to the noise experienced by UE r.

The intentional time offset experienced between UEs (users) and the pulse shape used in the system may have a significant influence between the symbols. TA-NOMA performs pre/post-coding to maximize the DoF using the R matrix. Equation 2 may be obtained by applying singular value decomposition (SVD) to the R matrix.

$$R = U_R \Lambda_R U_R^H . \Lambda_R = \begin{bmatrix} \lambda_1 & & & \\ & \lambda_2 & & \\ & & \ddots & \\ & & & \lambda_{NK} \end{bmatrix} \qquad \text{[Equation 2]}$$

The signal received by UE r may be newly expressed as in Equation 3 through additional processing at the transmission/reception end.

$$y^r = h_r \Lambda_R P x + n^r \qquad \text{[Equation 3]}$$

As expressed in Equation 3, since the transmission signal x is received after experiencing a diagonal matrix $\lambda_R$, the effect of eliminating interference between different user signals which has been generated by the intentional time offset may be obtained. This presents the advantage of maximizing the DoF through an intentional time offset.

Figure 3:
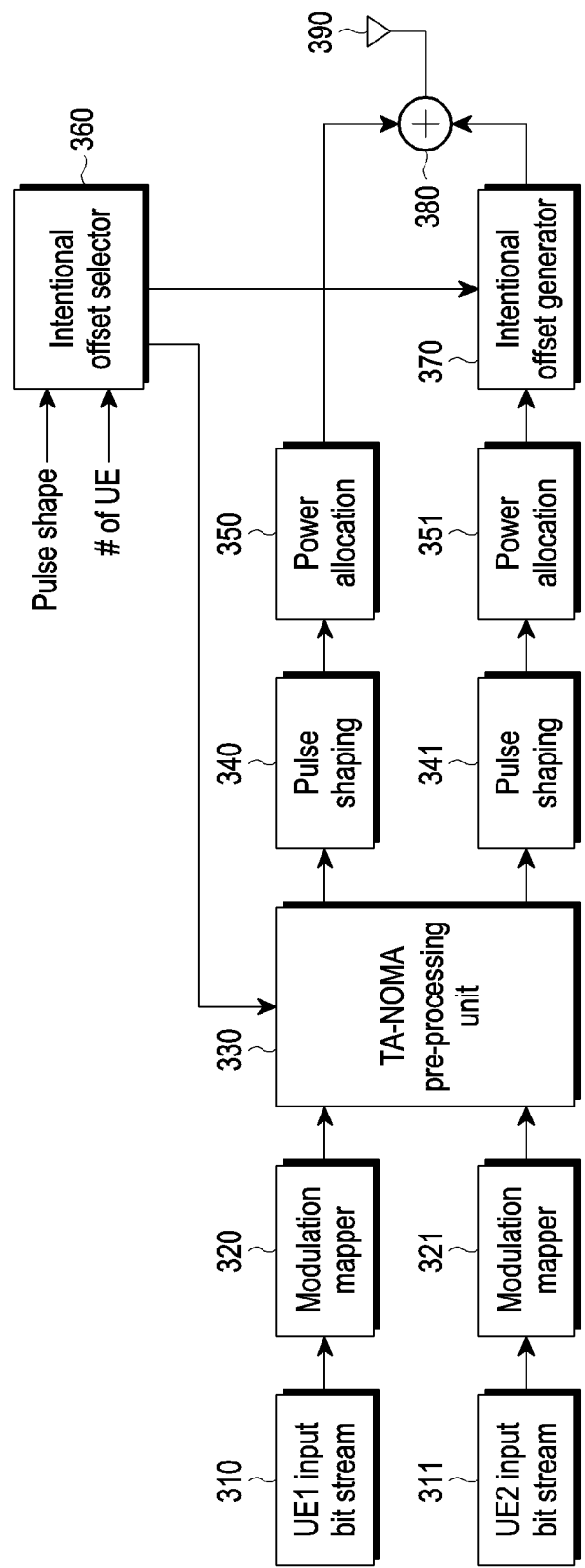
FIG. 3 illustrates a transmission structure in a TA-NOMA system supporting two UEs according to an embodiment of the disclosure.

FIG. 3 illustrates a transmission structure in a TA-NOMA system supporting two UEs according to an embodiment of the disclosure.

The transmission structure in the TA-NOMA system illustrated in FIG. 3 may be implemented in a base station (or eNodeB).

It is assumed in FIG. 3 that UE1 is a user equipment with no offset set, and UE2 is a user equipment with an offset set.

FIG. 3 illustrates a transmission structure of TA-NOMA. The TA-NOMA system may include a UE1 input bit stream block 310, a UE2 input bit stream block 311, a first modulation mapper block 320, a second modulation mapper block 321, a TA-NOMA pre-processing unit 330, a first pulse shape processing unit 340, a second pulse shape processing unit 341, a first power allocation unit 350, a second power allocation unit 351, an intentional offset selector 360, an intentional offset generator 370, an adder 380, and a transmission antenna 390.

The UE1 input bit stream block 310 provides an input bit stream for UE1 to be transmitted to the first modulation mapper block 320. The first modulation mapper block 320 may receive an input bit stream for UE1 and perform symbol mapping corresponding to a set modulation scheme. For example, in the case of the QPSK modulation scheme, the first modulation mapper block 320 may map two bits to four points on the constellation, and in the case of the 16QAM modulation scheme, the first modulation mapper block 320 may map four consecutive bits to 16 points on the constellation.

The TA-NOMA pre-processing unit 330 may preprocess (or precode), in one block unit, signals output from the first modulation mapper block 320 and the second modulation mapper block 321. The first pulse shape processing unit 340 may apply the pulse-shape used in the system to the pre-processed symbols. The first power allocation unit 350 may allocate transmission power to the signal to which the pulse shape is applied.

The UE2 input bit stream block 311 provides an input bit stream for UE2 to be transmitted to the second modulation mapper block 321. The second modulation mapper block 321 may receive an input bit stream for UE2 and perform symbol mapping corresponding to a set modulation scheme. For example, in the case of the QPSK modulation scheme, the second modulation mapper block 321 may map two bits to four points on the constellation, and in the case of the 16QAM modulation scheme, the second modulation mapper block 321 may map four consecutive bits to 16 points on the constellation.

The TA-NOMA pre-processing unit 330 may preprocess (or precode), in one block unit, signals output from the first modulation mapper block 320 and the second modulation mapper block 321. The second pulse shape processing unit 341 may apply the pulse-shape used in the system to the preprocessed symbols. The second power allocation unit 351 may allocate transmission power to the signal to which the pulse shape is applied.

The intentional offset selector 360 may select an intentional time offset to be applied to the UE2 signal based on the number of UEs used in the TA-NOMA system and the pulse-shape to be applied. The intentional offset generator 370 may set an intentional time offset selected by the intentional offset selector 360 for a signal for UE2 to which transmission power is allocated in the second power allocation unit 351.

The adder 380 may add (or multiplex) the UE1 signal output via the first power allocation unit 350 and the UE2 signal output via the intentional offset generator 370, and may transmit the added (or multiplexed) signals via the transmission antenna 390.

In the TA-NOMA transmission end structure, the bit streams of two UEs (e.g., UE1 and UE2) to be transmitted undergo block-by-block preprocessing output from the bit-constellation mapper. After preprocessing, the pulse-shape used in the system may be applied to the symbols, and in the TA-NOMA system, an intentional time offset may be applied to a preset UE (e.g., UE2).

In FIG. 3, for convenience of description, it is described that two UE transmission signals are transmitted in the TA-NOMA transmission end structure and an intentional time offset is set for a signal of one of the two UEs. However, the technical spirit of the disclosure is not limited to two UEs and may be applied to three or more UEs. In this case, an intentional time offset may be applied to a signal of at least one UE among three or more UEs.

According to an embodiment, the following elements are required to determine an optimal time offset to be applied to users (or UEs).

Number of users (or UEs) used in TA-NOMA: It is necessary to set an individual time offset for each user (or UE) used in TA-NOMA.

Pulse shape: Since the influence on each other varies depending on the pulse shape used in the TA-NOMA system, the shape of the R matrix representing the influence on each other changes.

Block length: In a small block length, the use of additional time resources due to intentional time offset has a great influence, so that the loss increases as compared with the performance enhancement obtained by enhancing the DoF.

The following output is obtained based on the above-described elements (at least one of the number of users (or UEs) used in TA-NOMA, pulse shape, and block length).

Optimal intentional time offset: The transmission end may intentionally generate a time offset between users (or UEs) based on the optimal time offset obtained based on the above-described elements (at least one of the number of users (or UEs) used in TA-NOMA, pulse shape, and block length).

Degree of oversampling: It is required to perform oversampling as compared with the conventional art and receive a signal to receive the signal with the intentionally generated time offset reflected.

Pre/post-coder: The form of the pre/post-coder is varied depending on the intentional time offset and the pulse shape obtained based on the above-described elements.

Figure 4:
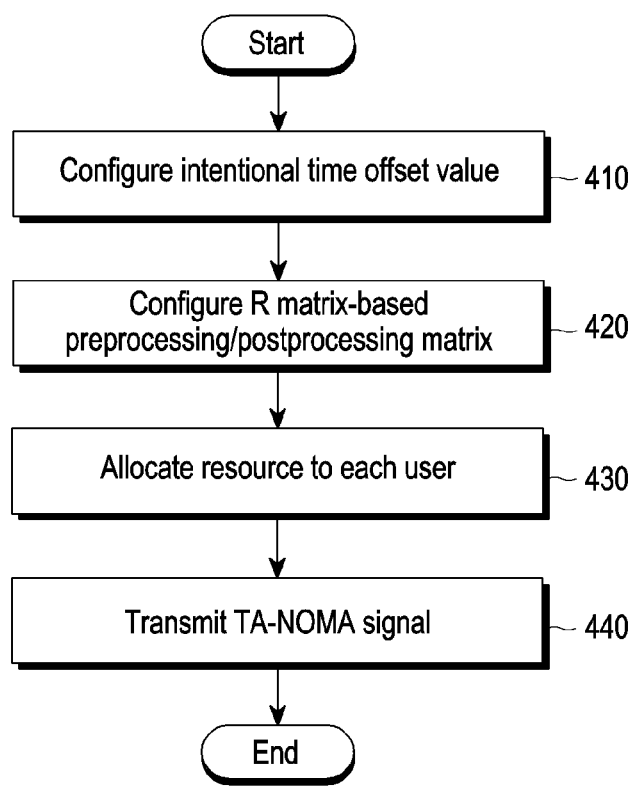
FIG. 4 is a flowchart illustrating an operation of transmitting a signal in a TA-NOMA system according to an embodiment of the disclosure.

FIG. 4 is a flowchart illustrating an operation of transmitting a signal in a TA-NOMA system according to an embodiment of the disclosure.

The process shown in FIG. 4 may be executed by a controller or processor implemented in the base station (or eNodeB).

Step 410: The base station (or eNodeB) may set an optimal offset according to the number of UEs and pulse shape supported by the TA-NOMA system. To obtain the optimal intentional time offset, optimization may be configured to select the offset according to the parameters required by the system. According to an embodiment, Equation 4 below relates to optimization that maximizes the sum rate of users.

$$\tau_{opt} = \text{argmax}_\tau \sum_{i=1}^{K} \text{Rate}_i \quad \text{[Equation 4]}$$

subject to $0 < \tau_i < 1$, $\tau_i \in \tau$: time offset constraint $$\sum_{i=1}^{K} P_i \leq P.: \text{power constraint}$$

where $\text{Rate}_i =$ $$\sum_{m=1}^{N} \frac{1}{2} \log_2 \left(1 + \frac{h_i P_i \lambda_{im}}{\sigma_n^2}\right): i번째 UE의 \text{ data rate}$$

i번 째 UE의 data rate: data rate of ith UE

An intentional time offset degree may be allocated to each UE to maximize the sum rate of K users (or UEs) based on Equation 4. The intentional time offset $\tau_i$ means the degree of time offset generated in UE i based on UE0 which is the reference UE. The intentional time offset $\tau_i$ has a value between 0 and 1. In Equation 4, $\tau_i$ is the time offset degree generated in user i, and the offset of the time offset constraint may have a value between 0 and 1. In power constraint, since the maximum power that may be used when the base station transmits is usually set to P, the sum of the power $P\_i$'s allocated to each user may not be greater than P. Rate_i means the data transmission rate value obtained based on the time offset $\tau_i$ generated in user i, and may be calculated based on the reception signal described in connection with Equation 3. N may be the number of symbols (e.g., N=3 in FIG. 2) constituting one transmission signal block. $\lambda_{im}$ is a diagonal matrix value that may be seen in Equation 2 obtained after SVD, and means an eigen value obtained through SVD, through which rate calculation may be performed. K refers to the total number of users.

However, the method for maximizing the sum rate described in Equation 4 is merely an example of one of various methods, and the technical spirit of the disclosure is not limited to the above example. The sum rate for multiple UEs may be maximized by utilizing various methods, such as maximizing the fairness of two users.

The transmission end may set an optimal time offset according to the requirements of the wireless communication system, and may pre-determine and use an offset in the form of a table according to the number of users (or UEs) and the pulse shape.

Table 1 shows an example of a time offset defined in the form of a table. Table 1 shows a case where intentional time offsets are allocated to each UE at equal intervals according to the number of users (or UEs) supported by TA-NOMA. The time offset interval may be flexibly changed according to issues such as system complexity and implementation required by the system.

TABLE 1

|  | 2 UE | 3 UE | 4 UE |
|---|---|---|---|
| $\tau_0$ | 0 | 0 | 0 |
| $\tau_1$ | 0.5 | 0.33 | 0.25 |
| $\tau_2$ | X (고려하지 않음) | 0.66 | 0.5 |
| $\tau_3$ | X (고려하지 않음) | X (고려하지 않음) | 0.75 |

( 고려하지 않음 ): (not considered)

Each UE may obtain intentional time offset information applied thereto according to Table 1 previously shared according to the number of users (or UEs) supported by the nonorthogonal multiple access system using the intentional time offset and the pulse shape used.

Step 420: Based on the optimal time offset obtained (or determined) in operation 410, the base station (or eNodeB) may configure an R matrix indicating an influence of signals of users (or UEs) on each other according to Equation 5. In other words, a block-by-block pre/post-coding matrix to be used by the transmission/reception end may be configured based on the optimal time offset.

Equation 5 shows an R matrix corresponding to when two users (or UEs) are supported and various pulse-shapes are used (e.g., $\beta=0$ (rectangular filter), $\beta=0.2$ (RRC filter)). A case of transmitting a TA-NOMA signal in block units of two symbols for each user (or UE) was considered.

$$[\beta = 0(\text{rectangular filter}), \tau = 0.5\text{인경우}]$$ [Equation 5]

$$R = \begin{bmatrix} 1.00 & 0.06 & 0.66 & -0.22 \\ 0.05 & 1.00 & 0.66 & 0.66 \\ 0.66 & 0.66 & 1.00 & 0.06 \\ -0.22 & 0.66 & 0.05 & 1.00 \end{bmatrix}, R = U_R \Lambda U_R^*$$

-continued $$U_R = \begin{bmatrix} -0.36 & 0.63 & 0.62 & -0.32 \\ -0.62 & -0.32 & -0.35 & -0.63 \\ -0.62 & 0.32 & -0.35 & 0.63 \\ -0.35 & -0.63 & 0.62 & 0.32 \end{bmatrix}$$

$$\Lambda = \begin{bmatrix} 2.06 & 0 & 0 & 0 \\ 0 & 1.52 & 0 & 0 \\ 0 & 0 & 0.38 & 0 \\ 0 & 0 & 0 & 0.03 \end{bmatrix}$$

$$[\beta = 0.2(RRC \text{ filter}), \tau = 0.5\text{인경우}]$$

$$R = \begin{bmatrix} 1.00 & 0.01 & 0.63 & -0.20 \\ 0.01 & 1.00 & 0.63 & 0.63 \\ 0.63 & 0.63 & 1.00 & 0.01 \\ -0.20 & 0.63 & 0.01 & 1.00 \end{bmatrix}, R = U_R \Lambda U_R^*$$

$$U_R = \begin{bmatrix} -0.34 & 0.62 & 0.62 & -0.33 \\ -0.62 & -0.33 & -0.34 & -0.62 \\ -0.62 & 0.33 & -0.34 & 0.62 \\ -0.34 & -0.62 & 0.62 & 0.33 \end{bmatrix}$$

$$\Lambda = \begin{bmatrix} 1.99 & 0 & 0 & 0 \\ 0 & 1.53 & 0 & 0 \\ 0 & 0 & 0.45 & 0 \\ 0 & 0 & 0 & 0.03 \end{bmatrix}$$

$$[\beta = 0.2(RRC \text{ filter}), \tau = 0.3\text{인경우}]$$

$$R = \begin{bmatrix} 1.00 & 0.01 & 0.86 & -0.18 \\ 0.01 & 1.00 & 0.37 & 0.86 \\ 0.86 & 0.37 & 1.00 & 0.01 \\ -0.18 & 0.86 & 0.01 & 1.00 \end{bmatrix}, R = U_R \Lambda U_R^*$$

$$U_R = \begin{bmatrix} -0.42 & 0.57 & 0.57 & -0.41 \\ -0.57 & -0.42 & -0.42 & -0.57 \\ -0.57 & 0.42 & -0.42 & 0.57 \\ -0.42 & -0.57 & 0.57 & 0.42 \end{bmatrix}$$

$$\Lambda = \begin{bmatrix} 2.00 & 0 & 0 & 0 \\ 0 & 1.79 & 0 & 0 \\ 0 & 0 & 0.18 & 0 \\ 0 & 0 & 0 & 0.02 \end{bmatrix}$$

... 인경우 → when ...

According to the intentional time offset and pulse shape, the R matrix indicating the influence between the symbols of the UE may be changed, and accordingly, the UR indicating precoding and the values $\Lambda$ of the diagonal matrix may be changed.

The base station (or eNodeB) may configure the R matrix through the number of UEs supported by the TA-NOMA system and the intentional time offset information allocated to each UE, and may configure the pre/post-coding matrix based thereon.

Step 430: The base station (or eNodeB) may allocate resources (symbols) for each user (or UE) based on pre/post-coding. In Equation 5, since values are listed in order of size in the diagonal matrix $\Lambda_R$, it is necessary to appropriately allocate the values to UE1 and UE2. The criteria for the allocation may include sum rate performance and fairness. Information about base station (or eNodeB) resource allocation may be signaled to the UE.

Step 440: The base station (or eNodeB) may transmit a signal to the UE through the resources allocated in step 430.

Figure 5:
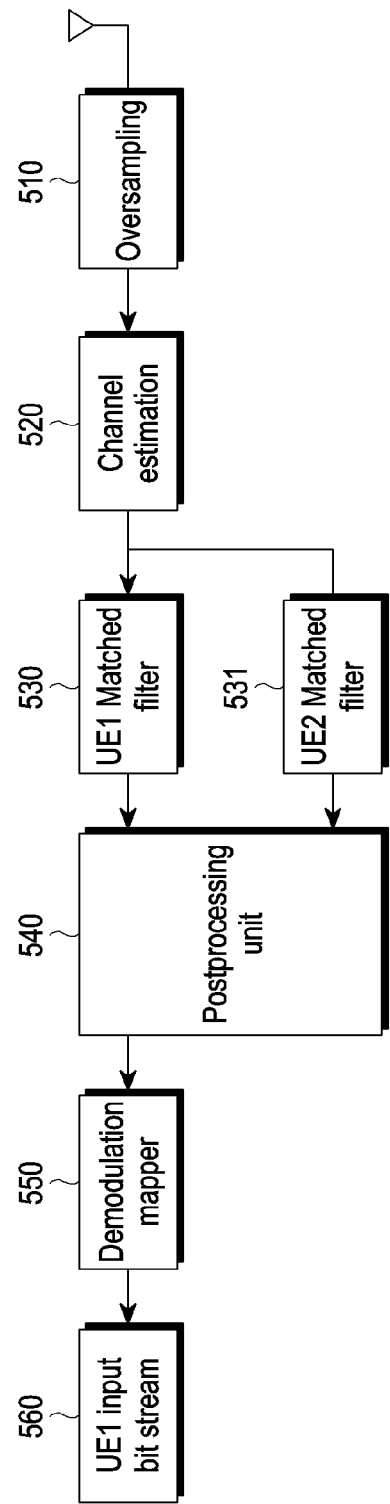
FIG. 5 illustrates a reception structure in a TA-NOMA system according to an embodiment of the disclosure.

FIG. 5 illustrates a reception structure in a TA-NOMA system according to an embodiment of the disclosure.

The reception structure in the TA-NOMA system illustrated in FIG. 5 may be implemented in one UE.

In FIG. 5, the TA-NOMA system may include an oversampling unit 510, a channel estimation unit 520, a UE1 matching filter 530, a UE2 matching filter 531, a TA-NOMA postprocessing unit 540, a demodulation mapper block 320, and a UE1 input bit stream block 560.

In FIG. 3, if an intentional time offset is set between two UEs, UE1 and UE2, reception for the symbol where a time offset is generated is possible only when more samples are obtained than in the conventional case where no intentional time offset is not set. Therefore, in the disclosure, a block for oversampling should be added compared to a wireless communication system with no intentional time offset set.

The oversampling unit 510 may receive the signal transmitted from the base station (or eNodeB) and perform sampling to identify the signal for which an intentional time offset is set.

The channel estimation unit 520 may estimate a channel for the oversampled signal, and the UE1 matching filter 530 and the UE2 matching filter 531 may filter the UE1 signal and the UE2 signal, respectively, from the channel estimated signal.

The TA-NOMA postprocessing unit 540 may post-process the signals output from the UE1 matching filter 530 and the UE2 matching filter 531 through a pre-exchanged postcoding matrix between the base station and the UE, and each UE may receive its own signal. The demodulation mapper block 320 may perform demodulation on the signal output from the TA-NOMA postprocessing unit 540 according to a set demodulation scheme, and the UE1 input bit stream block 560 may obtain the UE1 input bit stream from the output signal of the demodulation mapper block 320.

Additional signaling is required for the TA-NOMA system transmission/reception end according to an embodiment of the disclosure.

According to an embodiment, the base station may broadcast information about the TA-NOMA preprocessing matrix and the TA-NOMA postprocessing matrix through a control channel to share the TA-NOMA preprocessing matrix and the TA-NOMA postprocessing matrix with UEs. In this case, the information to be broadcast may include at least one of the intentional time offset applied to the signal to be transmitted to each UE, the number of symbols per block, and index information about a pre-agreed preprocessing matrix between transmission and reception ends.

According to an embodiment, the base station may transmit information obtained by quantizing the elements of the preprocessing matrix to the UE through a control channel.

Figure 6:
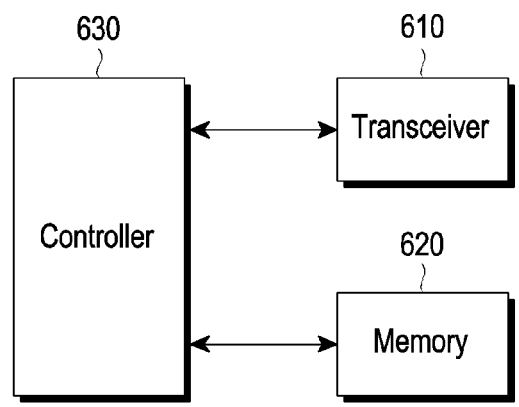
FIG. 6 illustrates a structure of a base station according to an embodiment of the disclosure.

FIG. 6 illustrates a structure of a base station according to an embodiment of the disclosure.

The base station described in connection with FIGS. 1 to 5 may correspond to the base station of FIG. 6. The transmission structure in the TA-NOMA system illustrated in FIG. 3 may be implemented in the base station of FIG. 6.

Referring to FIG. 6, the base station may include a transceiver 610, memory 620, and a controller 630. The transceiver 610, controller 630, and memory 620 of the base station may operate according to the above-described communication methods by the base station. However, the components of the base station are not limited thereto. For example, the base station may include more or fewer components than the above-described components. The transceiver 610, the controller 630, and the memory 620 may be implemented in the form of a single chip. The controller 630 may include one or more processors.

The transceiver 610 collectively refers to a receiver of the base station and a transmitter of the UE and may transmit and receive signals to/from the UE. To that end, the transceiver 610 may include a radio frequency (RF) transmitter for frequency-up converting and amplifying signals transmitted and an RF receiver for low-noise amplifying signals received and frequency-down converting the frequency of the received signals. However, this is merely an example of the transceiver 610, and the components of the transceiver 610 are not limited to the RF transmitter and the RF receiver.

The transceiver 610 may receive signals via a radio channel, output the signals to the controller 630, and transmit signals output from the controller 630 via a radio channel.

The memory 620 may store programs and data necessary for the operation of the base station. The memory 620 may store control information or data that is included in the signal obtained by the base station. The memory 620 may include a storage medium, such as ROM, RAM, hard disk, CD-ROM, and DVD, or a combination of storage media. Rather than being separately provided, the memory 620 may be embedded in the processor 630.

The controller 630 may control a series of processes for the base station to be able to operate according to the above-described embodiments. For example, the controller 630 may receive a control signal and a data signal through the transceiver 610 and process the received control signal and data signal. The controller 630 may transmit the processed control signal and data signal through the transceiver 610. There may be provided a plurality of controllers 630. The controller 630 may control the components of the base station by executing a program stored in the memory 420.

The controller 630 may control to transmit a signal using a time offset in a time-asynchronous nonorthogonal multiple access (TA-NOMA) system.

The controller 630 may identify a first bit stream for a first UE and a second bit stream for a second UE, determine a time offset for the second UE based on a pulse shape used in the TA-NOMA system and the number of UEs operating in the TA-NOMA system, and control to transmit a first signal corresponding to the first bit stream and a second signal corresponding to the second bit stream on a resource allocated based on the time offset.

According to an embodiment, the controller 630 may identify information about a plurality of time offsets previously determined according to the number of the UEs and the pulse shape and determine the time offset for the second UE based on the information about the plurality of time offsets.

According to an embodiment, the controller 630 may configure a pre-coding matrix in a block unit to be used in the base station based on the time offset and configure a post-coding matrix in a block unit to be used in the first UE and the second UE based on the time offset.

According to an embodiment, the controller 630 may allocate a resource in a symbol unit to each of the first UE and the second UE based on the pre-coding matrix and the post-coding matrix.

According to an embodiment, the controller 630 may control to broadcast at least one of the time offset for the second UE, the number of symbols per block, and index information about a precoding matrix predetermined between the base station and the UEs.

Figure 7:
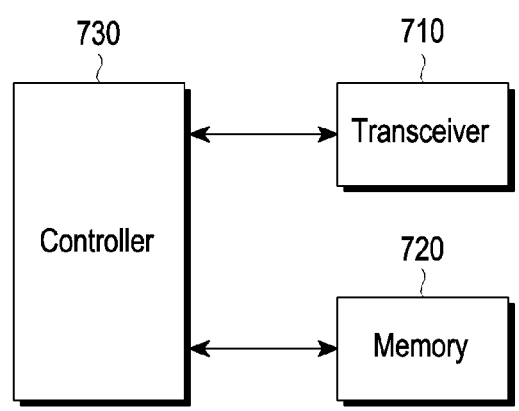
FIG. 7 illustrates a structure of a UE according to an embodiment of the disclosure.

FIG. 7 illustrates a structure of a UE according to an embodiment of the disclosure.

The UE described above in connection with FIGS. 1 to 5 may correspond to the UE of FIG. 7. The reception structure in the TA-NOMA system illustrated in FIG. 5 may be implemented in the UE of FIG. 7.

Referring to FIG. 7, the UE may include a transceiver 710, memory 720, and a controller 730. The transceiver 710, controller 730, and memory 720 of the UE may operate according to the above-described communication methods by the UE. However, the components of the UE are not limited thereto. For example, the UE may include more or fewer components than the above-described components. The transceiver 710, the controller 730, and the memory 720 may be implemented in the form of a single chip. The controller 730 may include one or more processors.

The transceiver 710 collectively refers to a receiver of the UE and a transmitter of the UE and may transmit and receive signals to/from the base station. To that end, the transceiver 710 may include a radio frequency (RF) transmitter for frequency-up converting and amplifying signals transmitted and an RF receiver for low-noise amplifying signals received and frequency-down converting the frequency of the received signals. However, this is merely an example of the transceiver 710, and the components of the transceiver 710 are not limited to the RF transmitter and the RF receiver.

The transceiver 710 may receive signals via a radio channel, output the signals to the controller 730, and transmit signals output from the controller 730 via a radio channel.

The memory 720 may store programs and data necessary for the operation of the UE. The memory 720 may store control information or data that is included in the signal obtained by the AMF. The memory 720 may include a storage medium, such as ROM, RAM, hard disk, CD-ROM, and DVD, or a combination of storage media. Rather than being separately provided, the memory 720 may be embedded in the processor 730.

The controller 730 may control a series of processes for the UE to be able to operate according to the above-described embodiments. For example, the controller 730 may receive a control signal and a data signal through the transceiver 710 and process the received control signal and data signal. The controller 730 may transmit the processed control signal and data signal through the transceiver 710. There may be provided a plurality of controllers 730. The controller 730 may control the components of the UE by executing a program stored in the memory 420.

The controller 730 may receive a signal using a time offset in a time-asynchronous nonorthogonal multiple access (TA-NOMA) system. The controller 730 may control to receive, from a base station, a first signal for another UE and a second signal for the UE, perform sampling on the first signal and the second signal to identify a time offset set for the second signal, and obtain a bit stream corresponding to the second signal based on a result of the sampling. The time offset may be determined based on the number of UEs operating in the TA-NOMA system and a pulse shape used in the TA-NOMA system.

According to an embodiment, the time offset for the UE may be determined based on information about a plurality of time offsets predetermined according to the number of UEs and the pulse shape.

According to an embodiment, a pre-coding matrix in a block unit to be used in the base station may be configured based on the time offset, and a post-coding matrix in a block unit to be used in the UE may be configured based on the time offset.

According to an embodiment, a resource in a symbol unit may be allocated for the UE based on the pre-coding matrix and the post-coding matrix.

According to an embodiment, the controller 730 may control to receive, from the base station, at least one of the time offset for the UE, the number of symbols per block, and index information about a precoding matrix predetermined between the base station and the UEs.

The methods according to the embodiments described in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in memory constituted of a combination of all or some thereof. As each constituting memory, multiple ones may be included.

The programs may be stored in attachable storage devices that may be accessed via a communication network, such as the Internet, Intranet, local area network (LAN), wide area network (WAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise. Further, it should also be noted that in some replacement embodiments, the functions mentioned in the blocks may occur in different orders. For example, two blocks that are consecutively shown may be performed substantially simultaneously or in a reverse order depending on corresponding functions.

Although specific embodiments of the present invention have been described above, various changes may be made thereto without departing from the scope of the present invention. Thus, the scope of the disclosure should not be limited to the above-described embodiments, and should rather be defined by the following claims and equivalents thereof.

The invention claimed is:

1. A method for transmitting a signal using a time offset by a base station in a time-asynchronous nonorthogonal multiple access (TA-NOMA) system, the method comprising:

identifying a first bit stream for a first user equipment (UE) and a second bit stream for a second UE;

determining a time offset for the second UE based on a number of UEs operating in the TA-NOMA system and a pulse shape used in the TA-NOMA system; and transmitting, on a resource allocated based on the time offset, a first signal corresponding to the first bit stream and a second signal corresponding to the second bit stream.

2. The method of claim 1, wherein determining the time offset includes:
identifying information about a plurality of time offsets predetermined according to the number of the UEs and the pulse shape; and
determining the time offset for the second UE based on information about the plurality of time offsets.

3. The method of claim 1, further comprising:
configuring a pre-coding matrix in a block unit to be used in the base station based on the time offset; and
configuring a post-coding matrix in a block unit to be used in the first UE and the second UE based on the time offset.

4. The method of claim 3, further comprising:
allocating a resource in a symbol unit for each of the first UE and the second UE based on the pre-coding matrix and the post-coding matrix.

5. The method of claim 1, further comprising:
broadcasting at least one of the time offset for the second UE, a number of symbols per block, and index information about a precoding matrix predetermined between the base station and the UEs.

6. A method for receiving a signal using a time offset by a UE in a time-asynchronous nonorthogonal multiple access (TA-NOMA) system, the method comprising:
receiving, from a base station, a first signal for another UE and a second signal for the UE;
performing sampling on the first signal and the second signal to identify a time offset set for the second signal; and
obtaining a bit stream corresponding to the second signal based on a result of the sampling,
wherein the time offset is determined based on a number of UEs operating in the TA-NOMA system and a pulse shape used in the TA-NOMA system.

7. The method of claim 6, wherein the time offset for the UE is determined based on information about a plurality of time offsets predetermined according to the number of the UEs and the pulse shape.

8. The method of claim 6, wherein a pre-coding matrix in a block unit to be used in the base station is configured based on the time offset, and
wherein a post-coding matrix in a block unit to be used in the UE is configured based on the time offset.

9. The method of claim 8, wherein a resource in a symbol unit is allocated for the UE based on the pre-coding matrix and the post-coding matrix.

10. The method of claim 6, further comprising:
receiving, from the base station, at least one of the time offset for the UE, a number of symbols per block, and index information about a precoding matrix predetermined between the base station and the UEs.

11. A base station transmitting a signal using a time offset in a time-asynchronous nonorthogonal multiple access (TA-NOMA) system, comprising:
a transceiver; and
a controller coupled with the transceiver and configured to control to:
identify a first bit stream for a first user equipment (UE) and a second bit stream for a second UE;
determine a time offset for the second UE based on a number of UEs operating in the TA-NOMA system and a pulse shape used in the TA-NOMA system; and
transmit a first signal corresponding to the first bit stream and a second signal corresponding to the second bit stream on a resource allocated based on the time offset.

12. The base station of claim 11, wherein the controller is configured to:
identify information about a plurality of time offsets predetermined according to the number of the UEs and the pulse shape; and
determine the time offset for the second UE based on information about the plurality of time offsets.

13. The base station of claim 11, wherein the controller is configured to:
configure a pre-coding matrix in a block unit to be used in the base station based on the time offset; and
configure a post-coding matrix in a block unit to be used in the first UE and the second UE based on the time offset.

14. A UE receiving a signal using a time offset in a time-asynchronous nonorthogonal multiple access (TA-NOMA) system, comprising:
a transceiver; and
a controller coupled with the transceiver and configured to control to:
receive, from a base station, a first signal for another UE and a second signal for the UE;
perform sampling on the first signal and the second signal to identify a time offset set for the second signal; and
obtain a bit stream corresponding to the second signal based on a result of the sampling,
wherein the time offset is determined based on a number of UEs operating in the TA-NOMA system and a pulse shape used in the TA-NOMA system.

15. The UE of claim 14, wherein the time offset for the UE is determined based on information about a plurality of time offsets predetermined according to the number of the UEs and the pulse shape.

* * * * *